(12) United States Patent
Yang et al.

(10) Patent No.: US 6,697,424 B1
(45) Date of Patent: Feb. 24, 2004

(54) FAST CONVERGENT PIPELINED ADAPTIVE DECISION FEEDBACK EQUALIZER USING POST-CURSOR PROCESSING FILTER

(75) Inventors: Meng-Da Yang, Miaoli (TW); An-Yeu Wu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/429,776

(22) Filed: May 6, 2003

(51) Int. Cl.[7] .............................. H03H 7/30; H04B 1/10
(52) U.S. Cl. ........................................ 375/233; 375/350
(58) Field of Search .................................. 375/229, 232, 375/233, 350, 285; 333/18, 28 R; 708/322, 301, 323; 455/13; 348/613

(56) References Cited

U.S. PATENT DOCUMENTS

| | | | |
|---|---|---|---|
| 4,789,994 A | * 12/1988 | Randall et al. | 375/233 |
| 5,031,194 A | * 7/1991 | Crespo et al. | 375/233 |
| 5,293,402 A | * 3/1994 | Crespo et al. | 375/233 |
| 5,414,733 A | * 5/1995 | Turner | 375/233 |
| 5,524,125 A | * 6/1996 | Tsujimoto | 375/347 |
| 5,748,674 A | * 5/1998 | Lim | 375/233 |
| 6,269,116 B1 | * 7/2001 | Javerbring et al. | 375/229 |
| 6,414,990 B1 | * 7/2002 | Jonsson et al. | 375/232 |

OTHER PUBLICATIONS

Shanbhag et al, "Piplelined Adaptive DFE Architectures Using Relaxed Look–Ahead," IEEE Transactions On Signal Processing vol. 43, No. 43, Jun. 1995, pp 1368–1385.*

Da Yang et al., High–Performance Adaptive Decision Feedback Equalizer Based on Predictive Parallel Branch Slicer Scheme Oct. 16–18, 2002, IEEE, pp 121–126.*

ISCAS 2002; May 26, 2002–May 29, 2002; Meng–Da Yang and An–Yeu Wu; *A New Pipelined Adaptive DFE Architecture With Improved Convergence Rate*; p. IV–213–IV–216; Scottsdale, Arizona.

* cited by examiner

Primary Examiner—Tesfaldet Bocure
(74) Attorney, Agent, or Firm—Bacon & Thomas, PLLC

(57) ABSTRACT

A fast convergent pipeline adaptive decision feedback equalizer using a post-cursor processing filter is disclosed, which includes a feed-forward equalizer, a post-cursor processing filter, an adder, a slicer, a register, a pipelined feedback equalizer, a subtractor and a updating device. The pipelined feedback equalizer has a delay device coupled to the register for delaying its output signal, and a feedback equalizer coupled to the delay device for eliminating the post-cursor of the output signal. By using the post-cursor processing filter (PCF), it increases the operating clock rate with arbitrary speedup factor, and improves the convergence rate of the overall system.

8 Claims, 11 Drawing Sheets

| channel I | $N_f$ | $N_b$ | $N_p$ | Step Size | Other parameters |
|---|---|---|---|---|---|
| Serial ADFE | 6 | 3 | 0 | $2^{-7}$ | $D_1=D_2=D_3=0, LA=0, D_4=1, D_6=4$ |
| PIPEADFE | 12 | 9 | 0 | $2^{-7}$ | $D_2=2D_1=12, D_3=3, LA=0, D_4=1, D_6=4$ |
| PCFADFE | 6 | 9 | 7 | $2^{-7}$ | $D_2=4D_1=2D_5=24, D_3=3, LA=0, D_4=1, D_6=4$ |

FIG. 5A

| channel II | $N_f$ | $N_b$ | $N_p$ | Step Size | Other parameters |
|---|---|---|---|---|---|
| Serial ADFE | 7 | 3 | 0 | $2^{-6}$ | $D_1=D_2=D_3=0, LA=0, D_4=1, D_6=7$ |
| PIPEADFE | 13 | 9 | 0 | $2^{-6}$ | $D_2=2D_1=12, D_3=3, LA=0, D_4=1, D_6=7$ |
| PCFADFE | 7 | 9 | 7 | $2^{-6}$ | $D_2=4D_1=2D_5=24, D_3=3, LA=0, D_4=1, D_6=7$ |

FIG. 5B

| channel III | $N_f$ | $N_b$ | $N_p$ | Step Size | Other parameters |
|---|---|---|---|---|---|
| Serial ADFE | 14 | 8 | 0 | $2^{-7}$ | $D_1=D_2=D_3=0, LA=0, D_4=1, D_6=12$ |
| PIPEADFE | 20 | 14 | 0 | $2^{-7}$ | $D_2=2D_1=12, D_3=3, LA=0, D_4=1, D_6=12$ |
| PCFADFE | 14 | 14 | 7 | $2^{-7}$ | $D_2=4D_1=2D_5=24, D_3=3, LA=0, D_4=1, D_6=12$ |

FIG. 5C

|  | speedup | 2 | N |
|---|---|---|---|
| PIPEADFE | Mult. in FFE and PCF | $2N_f + 2$ | $2(N_f + N - 1)$ |
| | Mult. in FBE | $2N_b$ | $2N_b$ |
| | Total adder | $2N_f + 2N_b + 1$ | $2(N_f + N_b + N) - 3$ |
| PCFADFE | Mult. in FFE and PCF | $2N_f + 2$ | $2(N_f + N - 1)$ |
| | Mult. in FBE | $2N_b$ | $2N_b$ |
| | Total adder | $2N_f + 2N_b + 1$ | $2(N_f + N_b + N) - 3$ |

FIG. 8

FAST CONVERGENT PIPELINED ADAPTIVE DECISION FEEDBACK EQUALIZER USING POST-CURSOR PROCESSING FILTER

BACKGROUND OF THE INVENTION

1. Field of the Invention

The present invention relates to the technical field of adaptive decision feedback equalizer (ADFE) and, more particularly, to a fast convergent pipelined adaptive decision feedback equalizer (PADFE) using post-cursor processing filter (PCF), which is capable of eliminating the inter-symbol interference (ISI) in input samples.

2. Description of Related Art

Conventionally, the adaptive decision feedback equalizer (ADFE) using Least Mean-Squared (LMS) algorithm is one of the key technique in many magnetic storage and digital communication applications. FIG. 1 shows a block diagram of a serial adaptive decision feedback equalizer 100 (ADFE). As shown, in the serial ADFE 100, a feed-forward equalizer (FFE) 110 is provided for receiving the input samples x(n) and eliminating pre-cursor of the input samples x(n). An adder 150 adds the output signal of the FFE 110 and a feedback signal to produce an pre-quantization signal. A slicer 130 quantizes the pre-quantization signal and produces a white quantized signal. A register 140 is coupled to the slicer 130 for holding the white quantized signal. A feedback equalizer (FBE) 120 is provided for eliminating the post-cursor of the white quantized signal and producing the feedback signal. A subtractor 160 subtracts the pre-quantization signal from the quantized signal to produce a cost signal. An updating device 170 updates coefficients of the FFE 110 and FBE 120 based on the cost signal.

The updating mechanism of the serial ADFE 100 is based on the least mean square (LMS) error algorithm. The corresponding equations of the LMS-based serial ADFE 100 can be described as follows:

$$\alpha(n)=\alpha_F(n)+\alpha_B(n), \tag{1a}$$

$$X(n)=[x(n) \ldots x(n-N_f)], \tag{1b}$$

$$Y(n)=[\hat{\alpha}(n-1),\hat{\alpha}(n-2), \ldots \hat{\alpha}(n-N_b)], \tag{1c}$$

$$\alpha_F(n)=C^T(n-1)X(n), \tag{1d}$$

$$\alpha_B(n)=D^T(n-1)Y(n), \tag{1e}$$

$$\hat{\alpha}(n)=Q[\tilde{\alpha}(n)], \tag{1f}$$

$$e(n)=\hat{\alpha}(n)-\tilde{\alpha}(n), \tag{1g}$$

$$C(n)=C(n-1)+\mu e(n)X(n), \tag{1h}$$

$$D(n)=D(n-1)+\mu e(n)Y(n), \tag{1i}$$

where $\alpha_F(n)$ is the output of FFE, $\alpha_B(n)$ is the output of FBE,

C(n) is the vector of FFE coefficients,

D(n) is the vector of FBE coefficients,

X(n) is the vector of received samples,

Y(n) is the vector of detected symbols, $\tilde{a}$ (n) is the input of the slicer Q(•), $\hat{a}$ (n) is the output of the slicer Q(•).

However, fine-grain pipelining of the serial ADFE 100 is known to be a difficult problem for high-speed applications and operating clock rate of the serial ADFE 100 is limited by a decision feedback loop (DFL) as shown in FIG. 1.

FIG. 2 shows a block diagram of a pipelined adaptive decision feedback equalizer 200 (PIPEADFE) for increasing the operating clock rate of the ADFE 100. To achieve the pipeline, a delay device 210 is introduced in the decision feedback loop. The delay device 210 is coupled between the register 140 and the feedback equalizer 120 for delaying the white quantized signal and increasing the number of pipeline stages for the feedback equalizer 120.

The equations for describing the pipeline adaptive decision feedback equalizer 200 (PIPEADFE) are summarized below:

$$\alpha(n)=\alpha_F(n)+\alpha_B(n), \tag{2a}$$

$$X(n)=[x(n),x(n-1), \ldots x(n-N_f+1)], \tag{2b}$$

$$Y(n)=[\hat{\alpha}(n-1-D_1),\hat{\alpha}(n-1-D_1), \ldots \hat{\alpha}(n-D_1-N_b)], \tag{2c}$$

$$\alpha_F(n)=C^T(n-D_4)X(n), \tag{2d}$$

$$\alpha_B(n)=D^T(n-D_4)Y(n), \tag{2e}$$

$$\hat{\alpha}(n)=Q[\tilde{\alpha}(n)], \tag{2f}$$

$$e(n)=\hat{\alpha}(n)-\tilde{\alpha}(n), \tag{2g}$$

$$C(n) = C(n - D_4) + \mu \sum_{i=0}^{LA-1} e(n - D_2 - i)X(n - D_2 - i), \tag{2h}$$

$$D(n) = D(n - D_4) + \mu \sum_{i=0}^{LA-1} e(n - D_3 - i)Y(n - D_3 - i), \tag{2i}$$

The pipelined adaptive decision feedback equalizer (PIPEADFE) 200 maintains the functionality in the statistical behavior instead of input-output behavior by using the relaxed look-ahead technique. However, it suffers from some performance degradation such as output SNR and convergence rate. Although, the operating clock rate of the PIPEADFE 200 is large than the ADFE 100. But the convergence rate of PIPEADFE 200 is quite slower than the ADFE 100. Therefore, there is a need to have a novel design of pipeline adaptive decision feedback equalizer that can mitigate and/or obviate the aforementioned problems.

SUMMARY OF THE INVENTION

The object of the present invention is to provide a fast convergent pipelined adaptive decision feedback equalizer using a post-cursor processing filter for eliminating the inter-symbol interference (ISI) in input samples, so as to increase operating clock rate and convergence rate of overall system.

To achieve the aforementioned object, there is provided a fast convergent pipelined adaptive decision feedback equalizer using a post-cursor processing filter, which comprises a feed-forward equalizer, a post-cursor processing filter, an adder, a slicer, a register, a pipelined feedback equalizer, a subtractor and an updating device. The feed-forward equalizer is provided for receiving input samples and eliminating pre-cursor of the input samples. The post-cursor processing filter is coupled to the feed-forward equalizer for producing an output signal. The adder is provided for adding the output signal of the post-cursor processing filter and a feedback signal to produce an pre-quantization signal. The slicer is coupled to the adder for quantizing the pre-quantization signal and producing a white quantized signal. The register is coupled to the slicer for holding the white quantized signal. The pipelined feedback equalizer has plurality of pipeline stages and is coupled to the register for eliminating the post-cursor of the white quantized signal and producing the feedback signal. The subtractor is provided for subtracting the pre-quantization signal from the quantized signal to produce a cost signal. The updating device is provided for updating coefficients of the feed-forward equalizer and pipelined feedback equalizer based on the cost signal and updating coefficients of the post-cursor processing filter based on the cost signal and the white quantized signal.

Other objects, advantages, and novel features of the invention will become more apparent from the following detailed description when taken in conjunction with the accompanying drawings.

BRIEF DESCRIPTION OF THE DRAWINGS

FIGS. 5(a)–(c) show parameter tables for simulation of channel I, II, and III, respectively;

FIG. 8 shows the hardware complexity of PIPEADFE and PCFADFE in speedup factor being equal to 2 and N.

DETAILED DESCRIPTION OF THE PREFERRED EMBODIMENT

Figure 3:
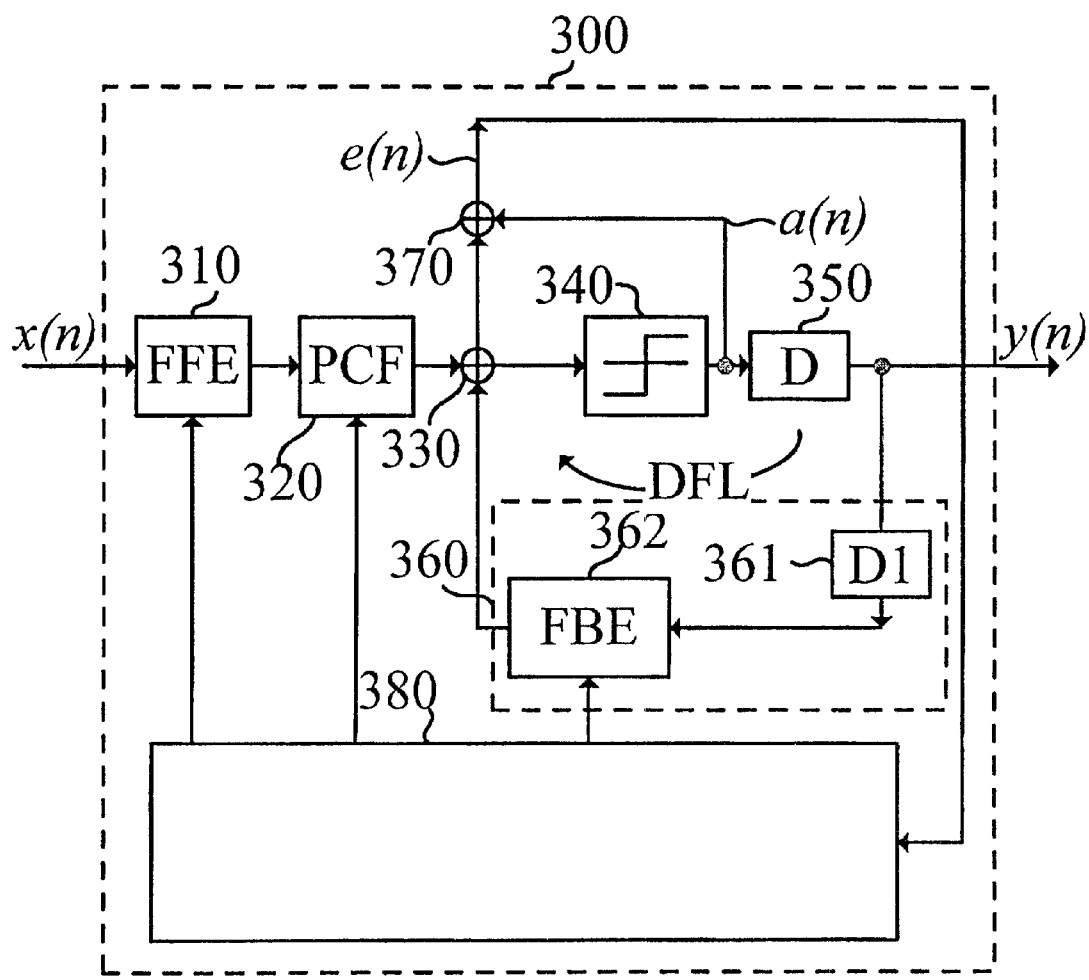
FIG. 3 shows a block diagram of a fast convergent pipelined adaptive decision feedback equalizer using a post-cursor processing filter (PCFADFE) in accordance with the present invention.

With reference to FIG. 3, there is shown a functional block diagram of a fast convergent pipelined adaptive decision feedback equalizer using post-cursor processing filter 300 (PCFADFE) according to the present invention, which includes a feed-forward equalizer 310, a post-cursor processing filter 320, an adder 330, a slicer 340, a register 350, a pipelined feedback equalizer 360, a subtractor 370, and an updating device 380. The feed-forward equalizer 310 receives the input samples x(n) and eliminates pre-cursor of the input samples x(n). The post-cursor processing filter 320 is coupled to the feed-forward equalizer 310 and produces an output signal. The adder 330 adds the output signal of the post-cursor processing filter 320 and a feedback signal to produces a pre-quantization signal. The slicer 340 is coupled to the adder 330 for quantizing the pre-quantization signal and producing a white quantized signal. The register 350 is coupled to the slicer 340 for holding the white quantized signal. The pipelined feedback equalizer 360 includes a delay device 361 coupled to the register 350 for delaying the white quantized signal, and a feedback equalizer 362 coupled to the delay device 361 for eliminating the post-cursor of the white quantized signal and producing the feedback signal. The subtractor 370 subtracts the pre-quantization signal from the quantized signal to produce a cost signal. The updating device 380 updates the coefficients of the feed-forward equalizer 310 and feedback equalizer 362 based on the cost signal and updates coefficients of the post-cursor processing filter 320 based on the cost signal and the white quantized signal.

Because the difference between the input and output of the slicer 340 is small, the behavior of DFE is close to an IIR filter with the transfer function as follows:

$$P(z) = \frac{N(z)}{D(z)}. \tag{3}$$

where N(z) is a transfer function of the feed-forward equalizer (FFE) 310, D(z) is a transfer function of the feedback equalizer (FBE) 362.

The decision feedback loop (DFL) can be pipelined by inserting a polynomial $$Q(z) = \sum_{i=0}^{D_1} q_i z^{-i}, q_0 = 1$$

to the numerator and denominator of equation (3). With the same number of poles and zeros being inserted in the numerator and denominator of equation (3), it is able to de-correlate the dependence of the output and the first $D_1$ ISI terms. The corresponding equation is given below:

$$P(z) = \frac{N(z)}{D(z)} = \frac{Q(z)N(z)}{Q(z)D(z)} = \frac{Q(z)N(z)}{1 - z^{-(D_1+1)}R(z)}, \tag{4}$$

where $$R(z) = \sum_{i=0}^{k} r_i z^{-i}.$$

With the extra delay device 361 that includes $D_1$ delay elements, the feedback equalizer 362 on the decision feedback loop (DFL) can be pipelined with $D_1$ pipeline stages. Then, a highest operating clock rate of the pipeline adaptive decision feedback equalizer 300 can be increased to a factor of $(D_1+1)$.

The coefficients of the feed-forward equalizer (FFE) 310 and feedback equalizer (FBE) 362 are dynamically updated based on minimizing a first cost function: $\|e(n)\|^2$, where e(n) is the cost signal. That is, the updating device 380 dynamically adjusts the coefficients of the feed-forward equalizer (FFE) 310 and feedback equalizer (FBE) 362 based on minimizing the first cost function: $\|e(n)\|^2$. By applying the stochastic gradient-based algorithm and technique of Sum-Relaxatio, the coefficients of the feed-forward equalizer (FFE) 310 and feedback equalizer (FBE) 362 can be respectively expressed as follows:

$$C(n) = C(n - D_4) + \mu \sum_{i=0}^{LA-1} e(n - D_2 - i)X(n - D_2 - i), \tag{5}$$

$$D(n) = D(n - D_4) + \mu \sum_{i=0}^{LA-1} e(n - D_3 - i)Y(n - D_3 - i), \tag{6}$$

According to the "Principle of Orthogonality", the coefficients of the post-cursor processing filter (PCF) 320 are updated based on minimizing a second cost function:

$$\text{Min}_{P_1}\{E^2\{e(n)a(n-1)\}\}, \text{Min}_{P_2}\{E^2\{e(n)a(n-2)\}\}, \ldots,$$

$$\text{Min}_{P_{D_1}}\{E^2\{e(n)a(n-D_1)\}\},$$

where e(n) is the cost signal, a(n) is the white quantized signal, and P(n)={P1,P2, . . . , PD1} represents the coefficients of the post-cursor processing filter (PCF) 320. The coefficients of the post-cursor processing filter (PCF) 320 are represented as follows:

$$P(n) = P(n - D_4) + \mu \sum_{i=0}^{LA-1} e(n - D_5 - i)Z(n - D_5 - i), \quad (7)$$

where $Z(n)=[a(n-1) \ldots a(n-D_1)]$.

Figure 1:
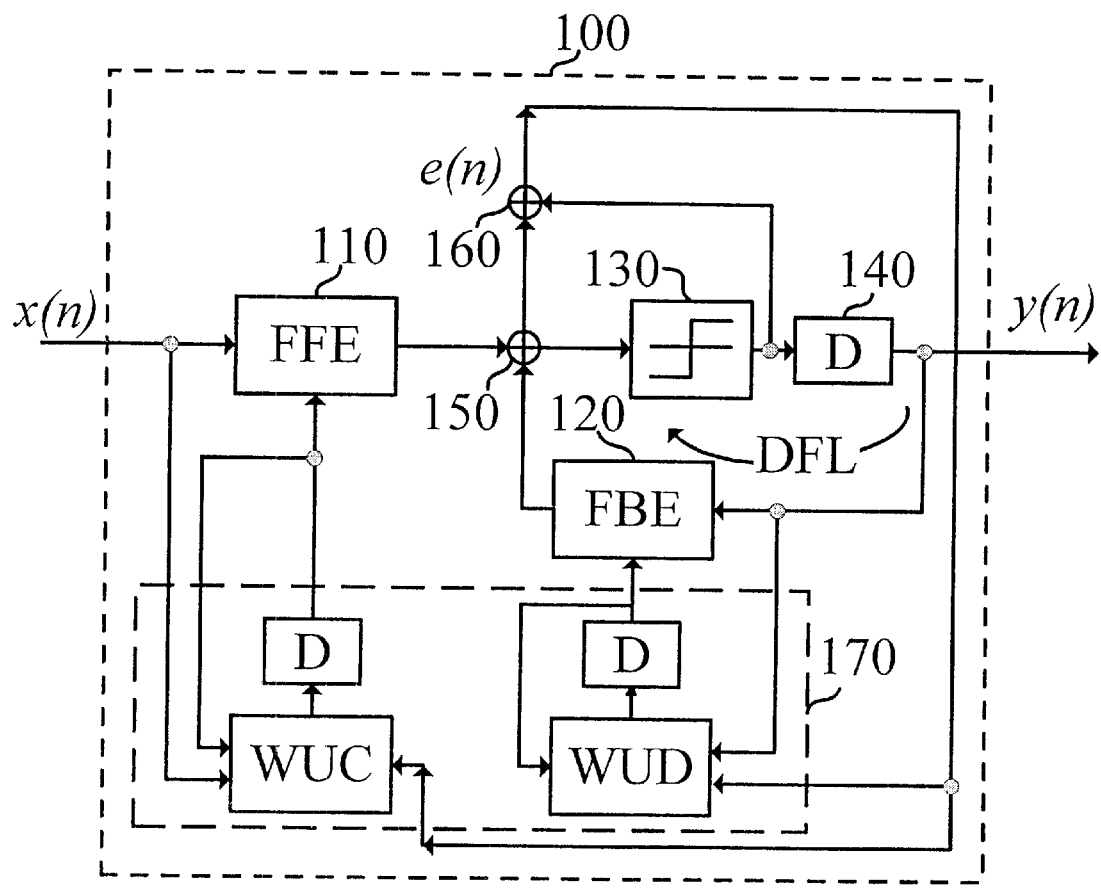
FIG. 1 shows a block diagram of a conventional serial adaptive decision feedback equalizer (ADFE)
Figure 2:
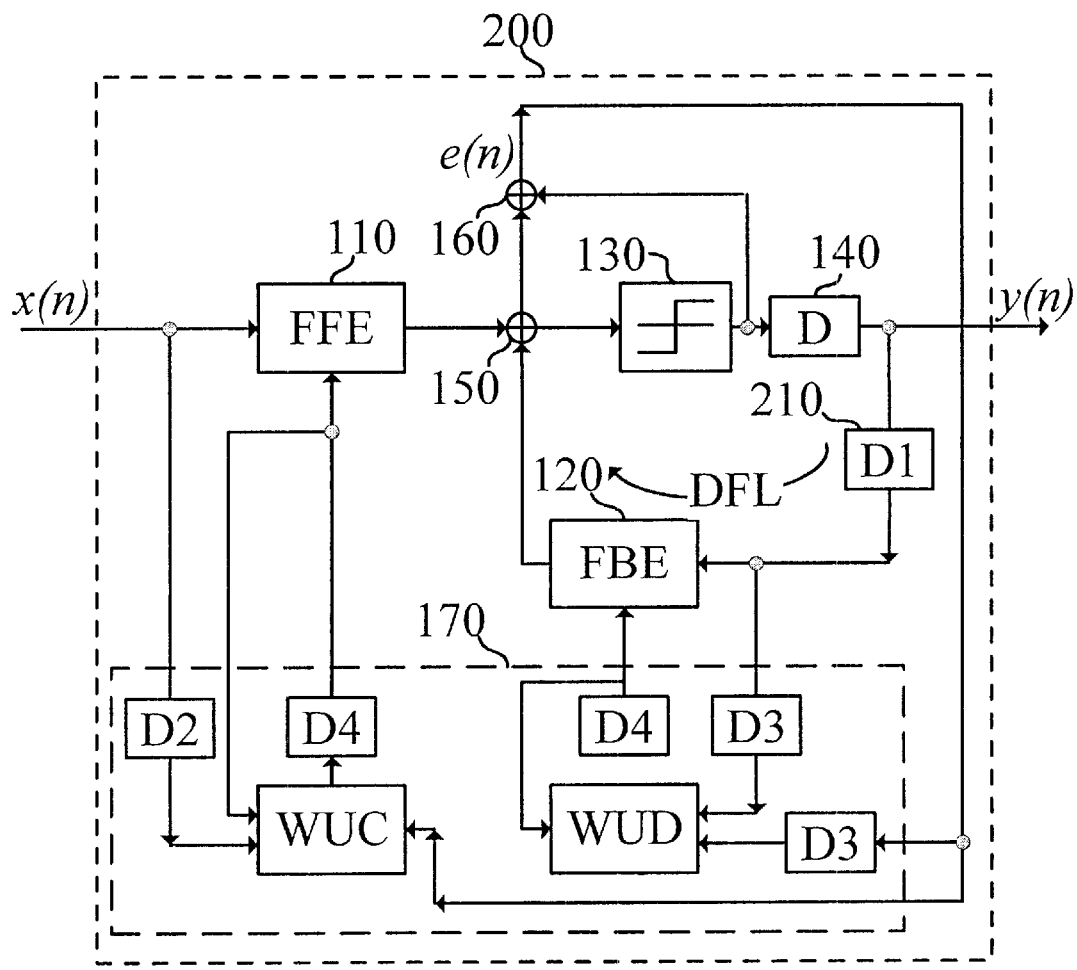
FIG. 2 shows a block diagram of a conventional pipeline adaptive decision feedback equalizer (PIPEADFE)
Figure 4:
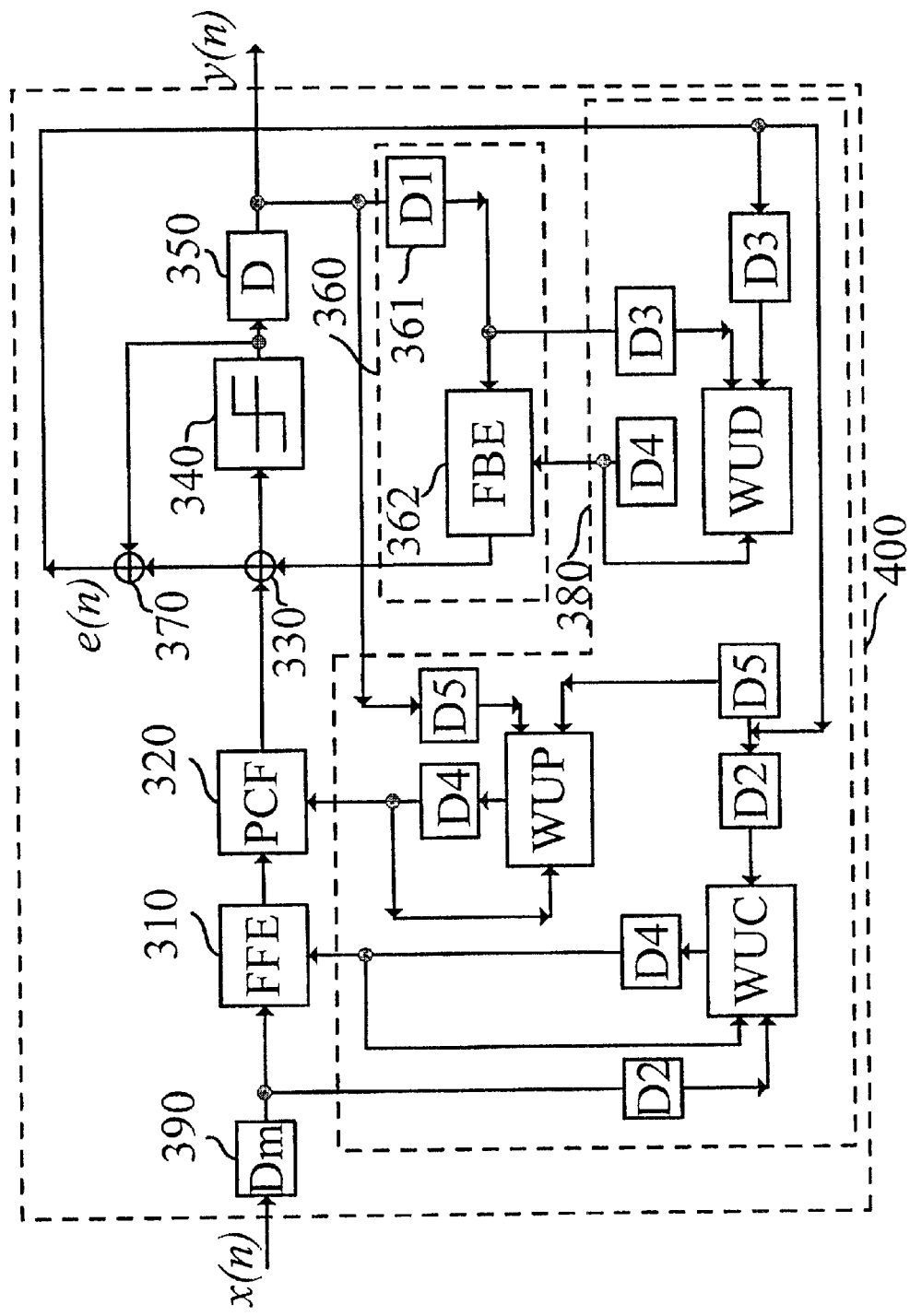
FIG. 4 shows an embodied circuit with a speedup factor of three in accordance with the present invention.

FIG. 4 shows an embodied circuit of present invention with a speedup factor of three ($D_1=2$). That is, the iteration bound of serial ADFE as shown in FIG. 1 is three times than the PCFADFE 400. This implies that there is two extra delay elements ($D_1=2$) inserted into the delay feedback loop (DFL). It is assumed that the transmitted data, w(n) (change a(n) to w(n)), is an independent sequence, and input data of receiver is x(n). The input data x(n) can be expressed as follows:

$$x(n)=h_{-1}w(n+1)+h_0w(n)+h_1w(n-1)+h_2w(n-2)+v(n), \quad (8)$$

where $h_{-1},h_0,h_1,h_2$, are channel impulse response, v(n) is the additive white Gaussian noise (AWGN). The number of taps in FFE 310 and FBE 362 are three and two, respectively. Since $D_1=2$, the number of taps in the PCF is three ($D_1+1$) in this embodiment. The i-th coefficients of FFE 310, PCF 320 and FBE 362 at time instance n are denoted as $c_i$, $p_i$, and $b_i$, respectively. With above notations, an estimation error or cost function e(n) can be expressed as:

$$e(n) = w(n) - F(n) - P(n) \quad (9a)$$
$$= w(n) - F(n) - p_1 F(n-1) - p_2 F(n-2) - B(n)$$

$$F(n) = \sum_{i=0}^{2} c_i x(n+i), \quad (9b)$$

$$B(n) = \sum_{i=1}^{2} b_i w(n-2-i), \quad (9c)$$

where F(n) is the output of FFE 310, and B(n) is the output of FBE 362. P(n) denotes the total effect of PCF 320 and FBE 310 at time instance n, and can be written as:

$$P(n) = p_1 F(n-1) + p_2 F(n-2) + B(n) \quad (10)$$
$$= \sum_{i=-2}^{4} s_i w(n-i) + \eta(n),$$

where η(n) is a noise component.

In the serial ADFE 100 as shown in FIG. 1, the objective of the FFE 110 is to minimize $E\{e^2(n)\}$. In the FFE 310 of the PCFADFE 400, it intends to minimize $e^2(n)$ instead of $E\{e^2(n)\}$. In order to apply stochastic gradient-based algorithm, it must find the gradient of this cost function e(n). Moreover, the total effect of PCF 320 and FBE 362 in time instance n can be considered as a constant. Hence, the gradients corresponding to $c_i$ are listed as follows:

$$\frac{\partial e(n)^2}{\partial c_0} = -2e(n)x(n), \quad (11a)$$

$$\frac{\partial e(n)^2}{\partial c_1} = -2e(n)x(n+1), \quad (11b)$$

$$\frac{\partial e(n)^2}{\partial c_2} = -2e(n)x(n+2), \quad (11c)$$

The results as listed above are similar to those of the serial ADFE 100. Hence, the main functionality of the FFE 310 in PCFADFE 400 is to cancel the precursor ISI terms. In present embodiment, it employs a dedicated PCF 320 to de-correlate the correlation between the first two post-cursor ISI terms and ADFE output. The remaining ISI terms will be canceled by FFE 310 and FBE 362, respectively.

Considering the PCF 320 and FBE 362, the output of FFE 310 at time instance n can be written as $$F(n) = \sum_{i=0}^{2} c_i x(n+i) = \sum_{i=-3}^{2} r_i w(n-i). \quad (12)$$

F(n) represents sum of the residual ISI terms that cannot be canceled by FFE 310 at time instance n. It is noted that, in the serial ADFE 100 as shown in FIG. 1, the prediction error must be orthogonal to the observations in the steady state, which is known as "Orthogonal Principle" in the literature of adaptive signal processing. It implies that minimizing the estimation error is equivalent to de-correlate the correlation between observations and filter output. Therefore, the objective of the PCF 320 is to minimize the following two expectation terms:

$$\text{Min}_{p_1}\{E^2\{e(n)w(n-1)\}\}, \quad (13a)$$

$$\text{Min}_{p_2}\{E^2\{e(n)w(n-2)\}\}, \quad (13b)$$

where $p_1, p_2$ are the coefficients of the 2-tap PCF 320. Next, the gradients corresponding to these cost functions are listed as follows:

$$\frac{\partial E^2\{w(n-1)e(n)\}}{\partial p_1} = 2r_0(r_1 + p_1 r_0 + p_2 r_{-1})E^2\{w^2(n-1)\} \quad (14a)$$
$$= -2r_0 E\{e(n)w(n-1)\}E\{w^2(n-1)\},$$

$$\frac{\partial E^2\{w(n-2)e(n)\}}{\partial p_2} = 2r_0(r_2 + p_1 r_1 + p_2 r_0)E^2\{w^2(n-2)\} \quad (14b)$$
$$= -2r_0 E\{e(n)w(n-2)\}E\{w^2(n-2)\}.$$

Because the direction of gradient is more important than the magnitude of gradient in stochastic gradient-based algorithm, it can approximate the gradient of (15) as follows:

$$\frac{\partial E\{w^2(n-1)e^2(n)\}}{\partial p_1} \cong -2E\{e(n)w(n-1)\}, \quad (15a)$$

-continued $$\frac{\partial E\{w^2(n-2)e^2(n)\}}{\partial p_2} \cong -2E\{e(n)w(n-2)\}. \quad (15b)$$

In FBE 362, it intends to minimize the same cost function of FFE 310. The gradients corresponding to FBE 362 are:

$$\frac{\partial E\{e^2(n)\}}{\partial b_1} = -2E\{e(n)w(n-3)\}, \quad (16a)$$

$$\frac{\partial E\{e^2(n)\}}{\partial b_2} = -2E\{e(n)w(n-4)\}. \quad (16b)$$

The equations derived for this embodiment can be generalized to the general case with arbitrary taps and arbitrary speedup factor. Finally, by combining with Delayed-LMS, Sum Relaxed Look-ahead and generalized cases of (11a), (15a), (16a), the equations to describe the PCFADFE 400 embodiment can be written as $$X(n) = [x(n) \ldots \ldots x(n-N_f+1)], \quad (17a)$$

$$Y(n) = [\hat{a}(n-D_1-1) \ldots \hat{a}(n-D_1-N_b)], \quad (17b)$$

$$Z(n) = [\hat{a}(n-1) \ldots \ldots \hat{a}(n-D_1)], \quad (17c)$$

$$P(n) = [p_1(n) \ldots \ldots p_{D_1}(n)], \quad (17d)$$

$$F(n) = C^T(n-D_4)X(n), \quad (17e)$$

$$B(n) = D^T(n-D_4)Y(n), \quad (17f)$$

$$\tilde{a}(n) = \sum_{i=0}^{D_1} p_j(n-D_4)F(n-j) + B(n), \; p_0 = 1, \quad (17g)$$

$$\tilde{a}(n) = Q[\tilde{a}(n)], \quad (17h)$$

$$e(n) = \hat{a}(n) - \tilde{a}(n), \quad (17i)$$

$$C(n) = C(n-D_4) + \mu \sum_{i=0}^{LA-1} e(n-D_2-i)X(n-D_2-i), \quad (17j)$$

$$D(n) = D(n-D_4) + \mu \sum_{i=0}^{LA-1} e(n-D_3-i)Y(n-D_3-i), \quad (17k)$$

$$P(n) = P(n-D_4) + \mu \sum_{i=0}^{LA-1} e(n-D_5-i)Z(n-D_5-i), \quad (17l)$$

where $p_j$ denotes the j-th coefficient of the PCF 320. The corresponding hardware architecture of PCFADFE 400 is shown in FIG. 4, where $D_m$ 390 are the dummy delays in order to pipeline feed-forward part of PCFADFE 400.

To verify the performance of present invention, t a simulation is performed on the serial ADFE 100, PIPEADFE 200 and PCFADFE 400 according to the present invention. In the simulation, three types of channel models are employed. In the first channel model (Channel I), it assumes that the channel impulse response, h=[0.2 0.6 1.0 −1.0 −0.6 −0.2], is obtained from a Lorentian pulse mode. The second channel impulse response (Channel II), h=[0.3365 1 0.3365], is obtained from typical channel models. The third channel impulse response (Channel III) is the typical channel impulse response of UTP-CAT-5, which is often employed in fast Ethernet applications. The transmitted data w(n) for all channel models is a PAM5 random sequence, w(n) ∈{−1, −0.5, 0, 0.5, 1}.

Figure 6A:
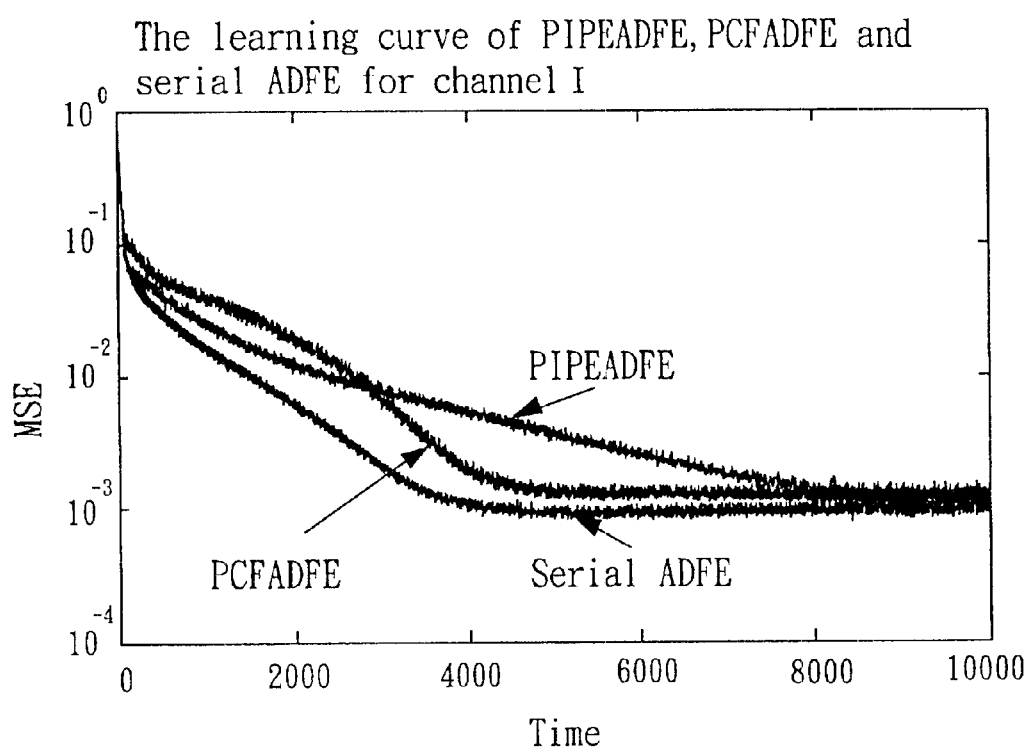
FIGS. 6(a)–(c) show simulation results according to the parameters in FIG. 5, respectively.
Figure 6B:
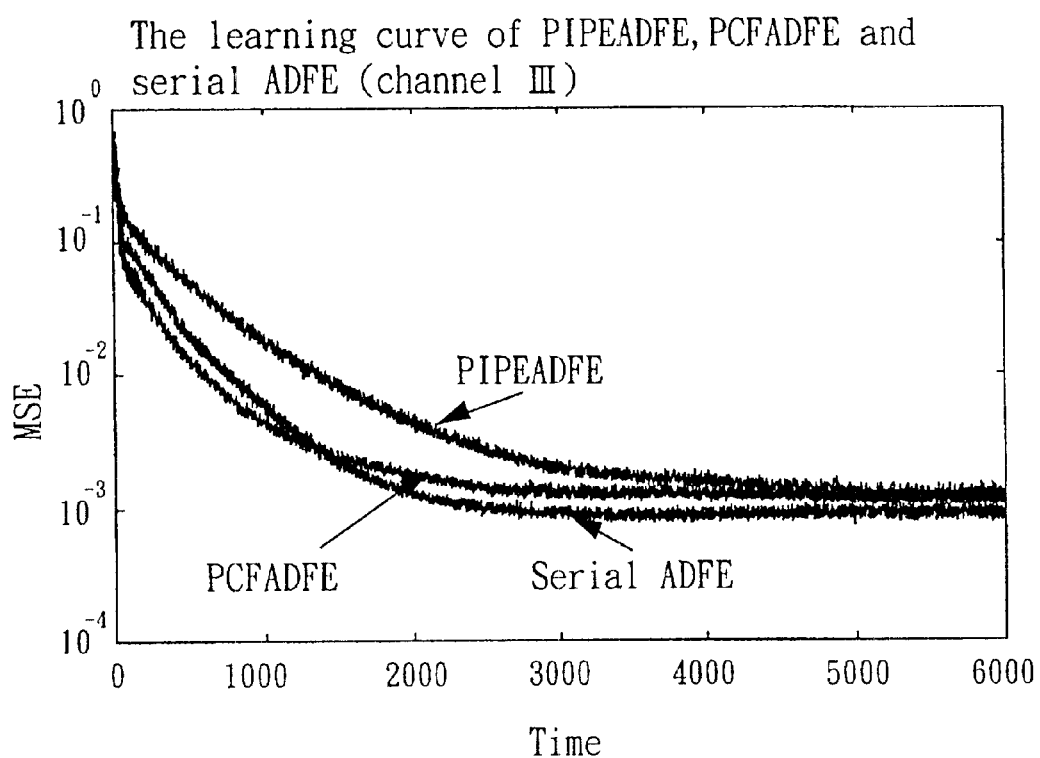
Figure 6C:
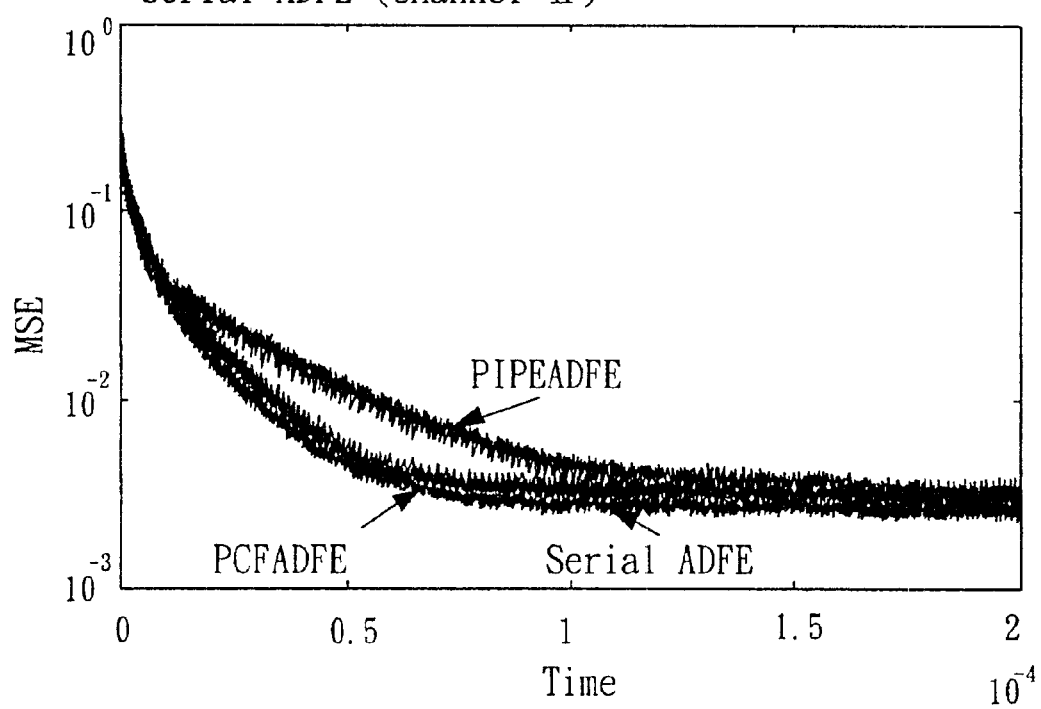

In the first simulation, it evaluate the convergence performance of both equalizers with input SNR=30dB. The parameter settings of serial ADFE 100, PIPEADFE 200 and PCFADFE 400 according to the present invention for these three channel models are listed in FIG. 5. With the parameters setting, the learning curves of PIPEADFE 200 and PCFADFE 400 for these channel models are shown in FIG. 6. Based on the results shown in FIG. 6, it shows that the convergence rate of PCFADFE 300 is faster than that of PIPEADFE 200. That is, the convergence performance is significantly improved by introducing the post-cursor processing filter (PCF) 320. It is known that the convergence rate of the conventional LMS-based serial ADFE 100 depends on the step size and the channel spectral characteristics, which relate to the eigenvalue ($\lambda_n$) of the received signal autocorrelation matrix. If the channel amplitude and phase distortions are small, the eigenvalue ratio ($\text{Max}(\lambda_n)/\text{Min}(\lambda_n)$) is close to one and, the serial ADFE 100 converges to its optimal tap coefficients relatively fast. On the contrary, if the channel exhibits poor spectral characteristics, such as relatively large attenuation in a part of its spectrum, the eigenvalue ratio will be larger than one (i.e. $\text{Max}(\lambda_n)/\text{Min}(\lambda_n) >> 1$). Thus, the convergence rate of LMS-based serial ADFE will be slow. By using the post-cursor processing filter (PCF), the decisions or the training sequences can be applied to the updating mechanism. By applying the train sequences or decisions into the updating mechanisms, the eigenvalue spread of input signal should be reduced. Thus, the convergence rate of PCFADFE can be faster than the PIPEADFE 200.

Figure 7:
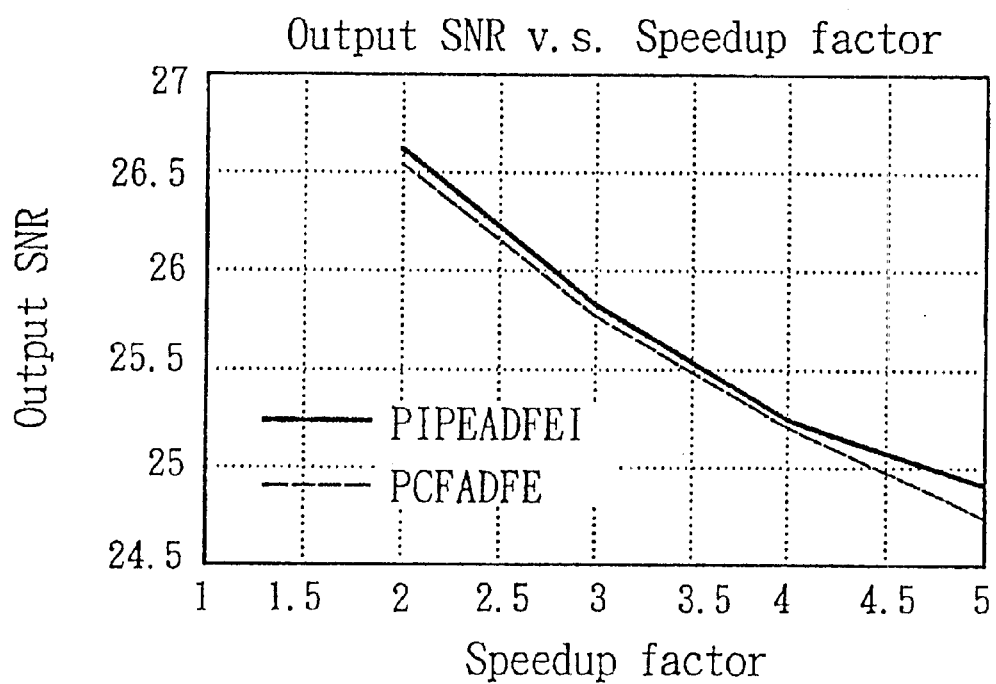
FIG. 7 shows the output SNR of PIPEADFE and PCFADFE vs. speedup factor.

As shown in FIG. 6, it is known that the PIPEADFE 200 and the PCFADFE 400 suffer from output SNR degradation in comparison with the serial ADFE 100. FIG. 7 shows how the output SNR of PIPEADFE 200 and PCFADFE 400 is degraded as the speedup factor is increased. The channel I is used and the parameters of PIPEADFE 200 and PCFADFE 400 are the same as shown in FIG. 5, except that $D_1$=speedup−1 and input SNR=28.451. The number of transmitted data samples in both PIPEADFE 200 and PCFADFE 400 is 10000. As shown, the output SNR and speedup factor are the x and y coordinates respectively. It can be seen that both PIPEADFE 200 and PCFADFE 400 have an output SNR loss of about 0.5 dB per unit increase in the speedup factor. Because the output SNR depends on the number of taps in FFE and PCF, it can choose the number of taps in FFE and PCF in order to make both architectures achieve the same output SNR, wherein the number of taps of FFE in PIPEADFE 200 is $N_f + D_1$, the number of taps of FFE in PCFADFE 400 is $N_f$, and the number of taps of PCF in PCFADFE 400 is $D_1$. Moreover, the number of taps in FBE is fixed on $N_b$ (Note that $N_f$ and $N_b$ are the number of taps of FFE and FBE in serial ADFE 100). The speedup factor versus hardware complexity is shown in FIG. 8. It can be seen that the hardware complexities of PIPEADFE 200 and PCFADFE 400 are the same. Nevertheless, the convergent rate of PCFADFE 300 is much faster than that of the PIPEADFE 200.

In view of the foregoing, it is known that the present invention utilizes the post-cursor processing filter (PCF) to not only increase the operating clock rate with arbitrary speedup factor but also dramatically improve the convergence rate of the overall system. Furthermore, the hardware overhead of the present invention is the same as the pipeline ADFE 200 (PIPEADFE).

Although the present invention has been explained in relation to its preferred embodiment, it is to be understood that many other possible modifications and variations can be made without departing from the spirit and scope of the invention as hereinafter claimed.

What is claimed is:

1. A fast convergent pipelined adaptive decision feedback equalizer using a post-cursor processing filter, comprising:
   a feed-forward equalizer for receiving input samples and eliminating pre-cursor of the input samples;
   a post-cursor processing filter coupled to the feed-forward equalizer and producing an output signal;
   an adder for adding the output signal of the post-cursor processing filter and a feedback signal to producing an pre-quantization signal;
   a slicer coupled to the adder for quantizing the pre-quantization signal and producing a white quantized signal;
   a register coupled to the slicer for holding the white quantized signal;
   a pipelined feedback equalizer having plurality of pipeline stages and coupling to the register for eliminating the post-cursor of the white quantized signal and producing the feedback signal;
   a subtractor for subtracting the pre-quantization signal from the quantized signal to produce a cost signal; and
   an updating device for updating coefficients of the feed-forward equalizer and pipelined feedback equalizer based on the cost signal and updating coefficients of the post-cursor processing filter based on the cost signal and the white quantized signal.

2. The fast convergent pipelined adaptive decision feedback equalizer as claimed in claim 1, wherein the pipelined feedback equalizer comprises a delay device coupled to the register for delaying the white quantized signal, and a feedback equalizer coupled to the delay device for eliminating the post-cursor of the white quantized signal and producing the feedback signal.

3. The fast convergent pipelined adaptive decision feedback equalizer as claimed in claim 2, wherein the post-cursor processing filter is formed by inserting the same poles and zeros pairs:

$$P(z) = \frac{N(z)}{D(z)} = \frac{Q(z)N(z)}{Q(z)D(z)} = \frac{Q(z)N(z)}{1 - z^{-(D_1+1)}R(z)},$$

where $N(z)$ is a transfer function of the feed-forward equalizer, $D(z)$ is a transfer function of the feedback equalizer, $$Q(z) = \sum_{i=0}^{D_1} q_i z^{-i}$$

is a transfer function of the post-cursor processing filter, parameter $D_1$ is the number of delay elements in the delay device.

4. The fast convergent pipelined adaptive decision feedback equalizer as claimed in claim 3, wherein a highest operating clock rate of the pipeline adaptive decision feedback equalizer can be increased to a factor of $(D_1+1)$.

5. The fast convergent pipelined adaptive decision feedback equalizer as claimed in claim 1, wherein the coefficients of the feed-forward equalizer and feedback equalizer are updated based on minimizing a first cost function: $\|e(n)\|^2$, where $e(n)$ is the cost signal.

6. The fast convergent pipelined adaptive decision feedback equalizer as claimed in claim 1, wherein the coefficients of the post-cursor processing filter are updated based on minimizing a second cost function:

$$\underset{P_1}{\text{Min}}\{E^2\{e(n)a(n-1)\}\}, \underset{P_2}{\text{Min}}\{E^2\{e(n)a(n-2)\}\}, \ldots ,$$

$$\underset{P_{D_1}}{\text{Min}}\{E^2\{e(n)a(n-D_1)\}\}$$

where $e(n)$ is the cost signal, $\alpha(n)$ is the white quantized signal, and $P(n)=\{P1,P2,\ldots,PD1\}$ represents the coefficients of the post-cursor processing filter.

7. The fast convergent pipelined adaptive decision feedback equalizer as claimed in claim 5, wherein the coefficients of the post-cursor processing filter are updated based on minimizing a second cost function:

$$\underset{P_1}{\text{Min}}\{E^2\{e(n)a(n-1)\}\}, \underset{P_2}{\text{Min}}\{E^2\{e(n)a(n-2)\}\}, \ldots ,$$

$$\underset{P_{D_1}}{\text{Min}}\{E^2\{e(n)a(n-D_1)\}\}$$

where $e(n)$ is the cost signal, $\alpha(n)$ is the white quantized signal, and $P(n)=\{P1,P2,\ldots,PD1\}$ represents the coefficients of the post-cursor processing filter.

8. The fast convergent pipelined adaptive decision feedback equalizer as claimed in claim 7, wherein the coefficients of the post-cursor processing filter are:

$$P(n) = P(n - D_4) + \mu \sum_{i=0}^{LA-1} e(n - D_5 - i)Z(n - D_5 - i),$$

where $Z(n)=[a(n-1) \ldots a(n-D_1)]$.

* * * * *